United States Patent
Schmiesing et al.

[11] Patent Number: 6,135,956
[45] Date of Patent: Oct. 24, 2000

[54] ULTRASONIC DIAGNOSTIC IMAGING SYSTEM WITH SPATIAL COMPOUNDING OF RESAMPLED IMAGE DATA

[75] Inventors: Daniel C. Schmiesing, Granite Falls; Robert R. Entrekin, Kirkland; James R. Jago; Roy B. Peterson, both of Seattle, all of Wash.

[73] Assignee: ATL Ultrasound, Inc., Bothell, Wash.

[21] Appl. No.: 09/335,160

[22] Filed: Jun. 17, 1999

Related U.S. Application Data

[60] Provisional application No. 60/102,923, Oct. 1, 1998.

[51] Int. Cl.$^7$ ....................................................... A61B 8/00
[52] U.S. Cl. ............................................................ 600/437
[58] Field of Search .................................... 600/437, 443, 600/447, 444, 454–456; 73/625–626

[56] References Cited

U.S. PATENT DOCUMENTS

| | | |
|---|---|---|
| 4,070,905 | 1/1978 | Kossoff . |
| 4,159,462 | 6/1979 | Rocha et al. ............................ 600/437 |
| 4,646,927 | 3/1987 | Fehr et al. .............................. 600/437 |
| 4,649,927 | 3/1987 | Fehr et al. . |
| 4,751,846 | 6/1988 | Dousse .................................... 600/443 |
| 5,396,890 | 3/1995 | Weng ...................................... 600/437 |
| 5,538,004 | 7/1996 | Bamber . |
| 5,566,674 | 10/1996 | Weng . |
| 5,782,766 | 7/1998 | Weng et al. . |
| 5,908,390 | 6/1999 | Matsushima . |

FOREIGN PATENT DOCUMENTS

| | | |
|---|---|---|
| 0 815 793 | 1/1998 | European Pat. Off. . |
| 0 859 242 | 8/1998 | European Pat. Off. . |
| 97 32277 | 9/1997 | WIPO . |
| WO 97/31650 | 9/1997 | WIPO . |

OTHER PUBLICATIONS

Domin et al., 1997, Biochem J, 326:139–47.
Molz et al, 1996, J. Biol Chem, 271:13892–9.
Virbassius et al., 1996, J Biol Chem, 271:13304–7.
Wymann et al., 1996, Mol Cell Biol, 16:1722–33.
Feigenbaum, Echocardiography, Lea & Febiger, 1976, at pp. 32–34, Philadelphia, PA.
Carpenter et al., Technical Note—A Multimode Real Time Scanner, Ultrsound in Med. & Biol., vol. 6, pp. 279–284, Pergamon Press Ltd. 1980, Great Britain.
Berson et al., Compound Scanning With a Electrically Steered Beam, Ultrasonic Imaging 3, pp. 303–308, Academic Press, Inc. 1981.
Shattuck et al., Compound Scanning With a Phased Array, Ultrasonic Imaging 4, pp. 93–107, Academic Press, Inc. 1982.
Jesperson et al., Multi–Angle Compound Imaging, Ultrasonic Imaging 20, pp. 81–102, Dynamedia, Inc. 1998.

*Primary Examiner*—Marvin M. Lateef
*Assistant Examiner*—Maulin Patel
*Attorney, Agent, or Firm*—W. Brinton Yorks, Jr.

[57] ABSTRACT

An ultrasonic diagnostic imaging system produces spatially compounded images by combining component frames acquired from different look directions. The component frames are acquired in estimate space, converted to sampled data in a common coordinate system and compounded. Conversion to the common coordinate system is performed by modulating the sampling to the desired coordinate system or by resampling of the image data. The estimate data of the spatially compounded image is then scan converted to a display data format for display of the spatially compounded image.

23 Claims, 9 Drawing Sheets

ULTRASONIC DIAGNOSTIC IMAGING SYSTEM WITH SPATIAL COMPOUNDING OF RESAMPLED IMAGE DATA

This application claims the benefit of Provisional U.S. Patent Application Ser. No. 60/102,923, filed Oct. 1, 1998.

This invention relates to ultrasonic diagnostic imaging systems and, in particular, to ultrasonic diagnostic imaging systems which produce spatially compounded images with resampled component image data.

Spatial compounding is an imaging technique in which a number of ultrasound images of a given target that have been obtained from multiple vantage points or angles are combined into a single compounded image by combining the data received from each point in the compound image target which has been received from each angle. Examples of spatial compounding may be found in U.S. Pat. Nos. 4,649,927; 4,319,489; and 4,159,462. Real time spatial compound imaging is performed by rapidly acquiring a series of partially overlapping component image frames from substantially independent spatial directions, utilizing an array transducer to implement electronic beam steering and/or electronic translation of the component frames. The component frames are combined into a compound image by summation, averaging, peak detection, or other combinational means. The acquisition sequence and formation of compound images are repeated continuously at a rate limited by the acquisition frame rate, that is, the time required to acquire the full complement of scanlines over the selected width and depth of imaging.

The compounded image typically shows lower speckle and better specular reflector delineation than conventional ultrasound images from a single viewpoint. Speckle is reduced (i.e. speckle signal to noise ratio is improved) by the square root of N in a compound image with N component frames, provided that the component frames used to create the compound image are substantially independent and are averaged. Several criteria can be used to determine the degree of independence of the component frames (see, e.g., O'Donnell et al. in IEEE Trans. UFFC v.35, no.4, pp 470–76 (1988)). In practice, for spatial compound imaging with a steered linear array, this implies a minimum steering angle between component frames. This minimum angle is typically on the order of several degrees.

The second way that spatial compound scanning improves image quality is by improving the acquisition of specular interfaces. For example, a curved bone-soft tissue interface produces a strong echo when the ultrasound beam is exactly perpendicular to the interface, and a very weak echo when the beam is only a few degrees off perpendicular. These interfaces are often curved, and with conventional scanning only a small portion of the interface is visible. Spatial compound scanning acquires views of the interface from many different angles, making the curved interface visible and continuous over a larger field of view. Greater angular diversity generally improves the continuity of specular targets. However, the angular diversity available is limited by the acceptance angle of the transducer array elements. The acceptance angle depends on the transducer array element pitch, frequency, and construction methods.

In accordance with the principles of the present invention, a sampled data system, preferably an ultrasound system with a digital beamformer, is used to acquire component images for spatial compounding from different look directions. The compounded image is generated by a two-step scan conversion process. In the first step, the acquired image data is resampled to a common reference in the acquisition data domain, referred to herein as estimate space. The component frames, after resampling, are preferably compounded in estimate space. The spatially compounded image data is then converted to video display data by scan conversion to display space. This processing approach reduces the amount of data involved in the compounding process and decouples the spatial compounding processing from the display frame rate, so that the two can be done asynchronously.

Figure 1:
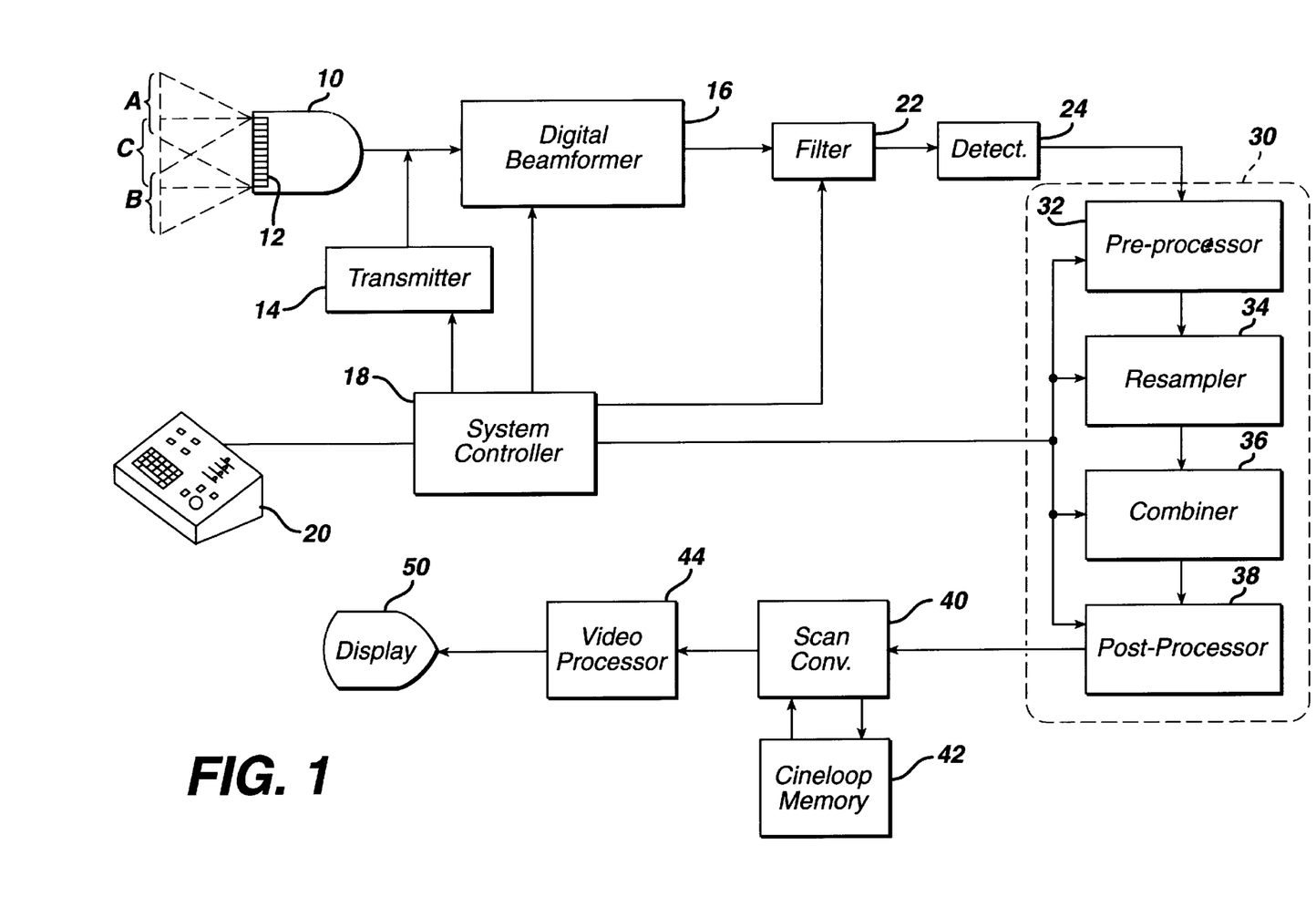
FIG. 1 illustrates in block diagram form an ultrasonic diagnostic imaging system constructed in accordance with the principles of the present invention.

Referring first to FIG. 1, an ultrasonic diagnostic imaging system constructed in accordance with the principles of the present invention is shown. A scanhead 10 including an array transducer 12 transmits beams at different angles over an image field denoted by the dashed rectangle and parallelograms. Three groups of scanlines are indicated in the drawing, labeled A, B, and C with each group being steered at a different angle relative to the scanhead. The transmission of the beams is controlled by a transmitter 14 which controls the phasing and time of actuation of each of the elements of the array transducer so as to transmit each beam from a predetermined origin along the array and at a predetermined angle. The echoes returned from along each scanline are received by the elements of the array, digitized as by analog to digital conversion, and coupled to a digital beamformer 16. The digital beamformer delays and sums the echoes from the array elements to form a sequence of focused, coherent digital echo samples along each scanline. The transmitter 14 and beamformer 16 are operated under control of a system controller 18, which in turn is responsive to the settings of controls on a user interface 20 operated by the user of the ultrasound system. The system controller controls the transmitter to transmit the desired number of scanline groups at the desired angles, transmit energies and frequencies. The system controller also controls the digital beamformer to properly delay and combine the received echo signals for the apertures and image depths used.

The scanline echo signals are filtered by a programmable digital filter 22, which defines the band of frequencies of interest. When imaging harmonic contrast agents or performing tissue harmonic imaging the passband of the filter 22 is set to pass harmonics of the transmit band. The filtered signals are then detected by a detector 24. In a preferred embodiment the filter and detector include multiple filters and detectors so that the received signals may be separated into multiple passbands, individually detected and recombined to reduce image speckle by frequency compounding. For B mode imaging the detector 24 will perform amplitude detection of the echo signal envelope. For Doppler imaging ensembles of echoes are assembled for each point in the image and are Doppler processed to estimate the Doppler shift or Doppler power intensity.

In accordance with the principles of the present invention the digital echo signals are processed by spatial compounding in a processor 30. The digital echo signals are initially pre-processed by a preprocessor 32. The pre-processor 32 can preweight the signal samples if desired with a weighting factor. The samples can be preweighted with a weighting factor that is a function of the number of component frames used to form a particular compound image. The pre-processor can also weight edge lines that are at the edge of one overlapping image so as to smooth the transitions where the number of samples or images which are compounded changes. The pre-processed signal samples may then undergo a resampling in a resampler 34. The resampler 34 can spatially realign the estimates of one component frame or to the pixels of the display space.

After resampling the image frames are compounded by a combiner 36. Combining may comprise summation, averaging, peak detection, or other combinational means. The samples being combined may also be weighted prior to combining in this step of the process. Finally, post-processing is performed by a post-processor 38. The post-processor normalizes the combined values to a display range of values. Post-processing can be most easily implemented by look-up tables and can simultaneously perform compression and mapping of the range of compounded values to a range of values suitable for display of the compounded image.

The compounding process may be performed in estimate data space or in display pixel space. In a preferred embodiment scan conversion is done following the compounding process by a scan converter 40. The compound images may be stored in a Cineloop® memory 42 in either estimate or display pixel form. If stored in estimate form the images may be scan converted when replayed from the Cineloop memory for display. The scan converter and Cineloop memory may also be used to render three dimensional presentations of the spatially compounded images as described in U.S. Pat. Nos. 5,485,842 and 5,860,924. Following scan conversion the spatially compounded images are processed for display by a video processor 44 and displayed on an image display 50.

Figure 2:
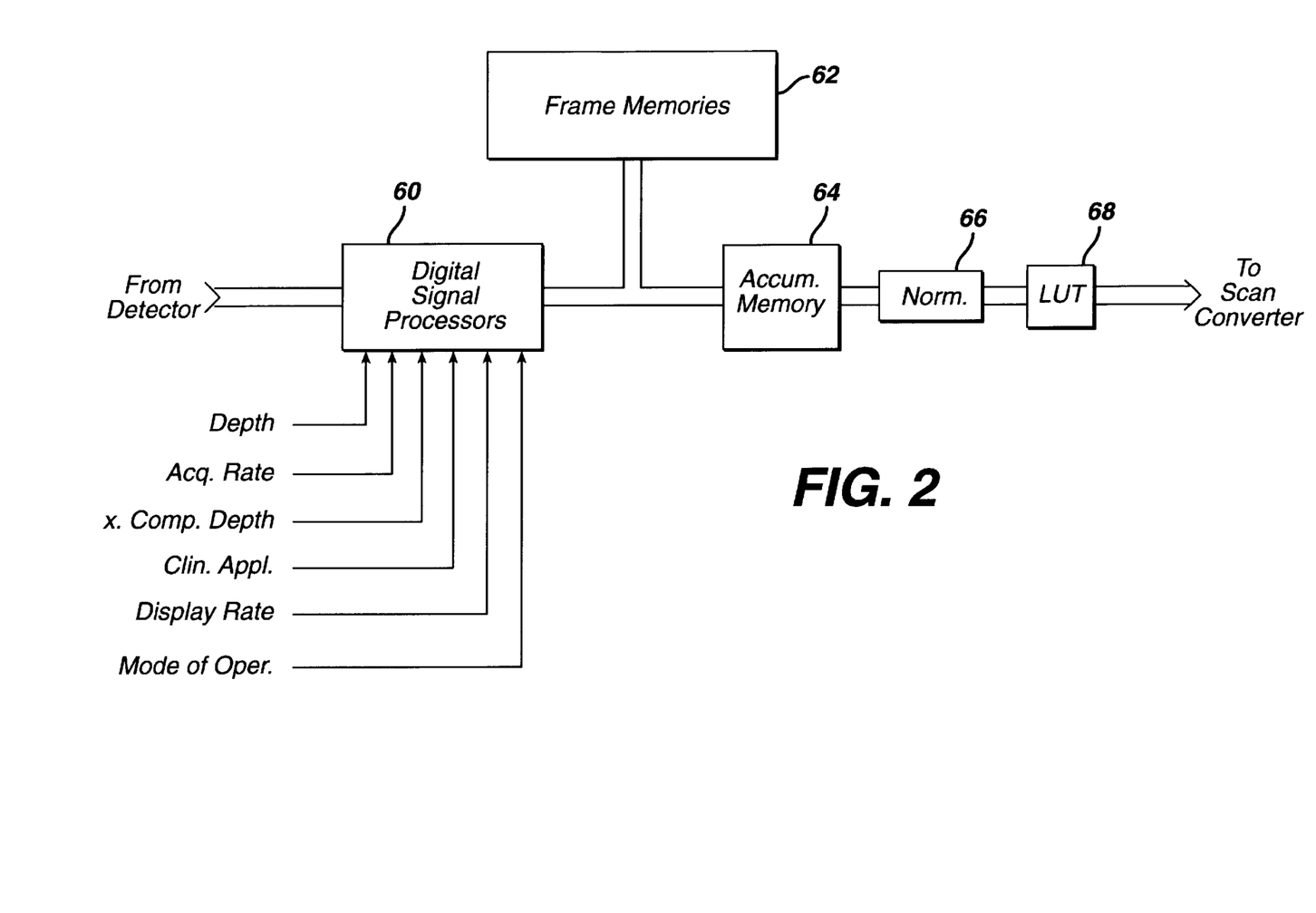
FIG. 2 illustrates in block diagram form a preferred implementation of the spatial compounding processor of FIG. 1.

FIG. 2 illustrates a preferred implementation of the spatial compounding processor 30 of FIG. 1. The processor 30 is preferably implemented by one or more digital signal processors 60 which process the image data in various ways. The digital signal processors 60 can weight the received image data and can resample the image data to spatially align pixels from frame to frame, for instance. The digital signal processors 60 direct the processed image frames to a plurality of frame memories 62 which buffer the individual image frames. The number of image frames capable of being stored by the frame memories 62 is preferably at least equal to the maximum number of image frames to be compounded such as sixteen frames. In accordance with the principles of the present invention, the digital signal processors are responsive to control parameters including image display depth, depth of region of greatest compounding, clinical application, compound display rate, mode of operation, and acquisition rate for determining the number of images to compound at a given instant in time. The digital signal processors select component frames stored in the frame memories 62 for assembly as a compound image in accumulator memory 64. The compounded image formed in the accumulator memory 64 is weighted or mapped by a normalization circuit 66, then compressed to the desired number of display bits and, if desired, remapped by a lookup table (LUT) 68. The fully processed compounded image is then transmitted to the scan converter for formatting and display.

There are several approaches which can be taken to processing component images for compounding and displaying the resultant spatially compounded images. One is to fully process each component image as it is received to produce a component image at the output of the scan converter 40 in display data coordinates. Component images can be produced and stored in Cineloop memory in this way, then compounded when the complete set of component images for a compound image has been acquired and processed. The approach has several drawbacks. One is that the scan conversion process from estimate space to display space is usually computationally intensive and time-consuming, which can reduce the frame rate of display of the compounded images. This is because a vast amount of data must be compounded, since the display format will generally contain a data value for each pixel in the display. A typical display format can have 640 by 480 display pixels. This processing can also adversely affect the frame rate of display.

Another consideration when spatially compounding images is the relative alignment of image data in the component images which are being compounded. In a sampled data ultrasound system each scanline comprises a sequence of samples at discrete points along the scanline. Ultrasound image data can be put into a sampled data format by digitizing scanline data after beamforming. In the preferred embodiment of the present invention, a digital beamformer is used and the scanline data from each transducer array element is digitized before beamforming. In either case, the digital scanline data requires information which locates the data samples in the image field, and data representing the echo signal levels. Ideally, each component image would have numerous image data samples at the same locations as the data is located in other component images, thereby allowing the image data at the common locations to be compounded at each of those points in the image.

Figure 3:
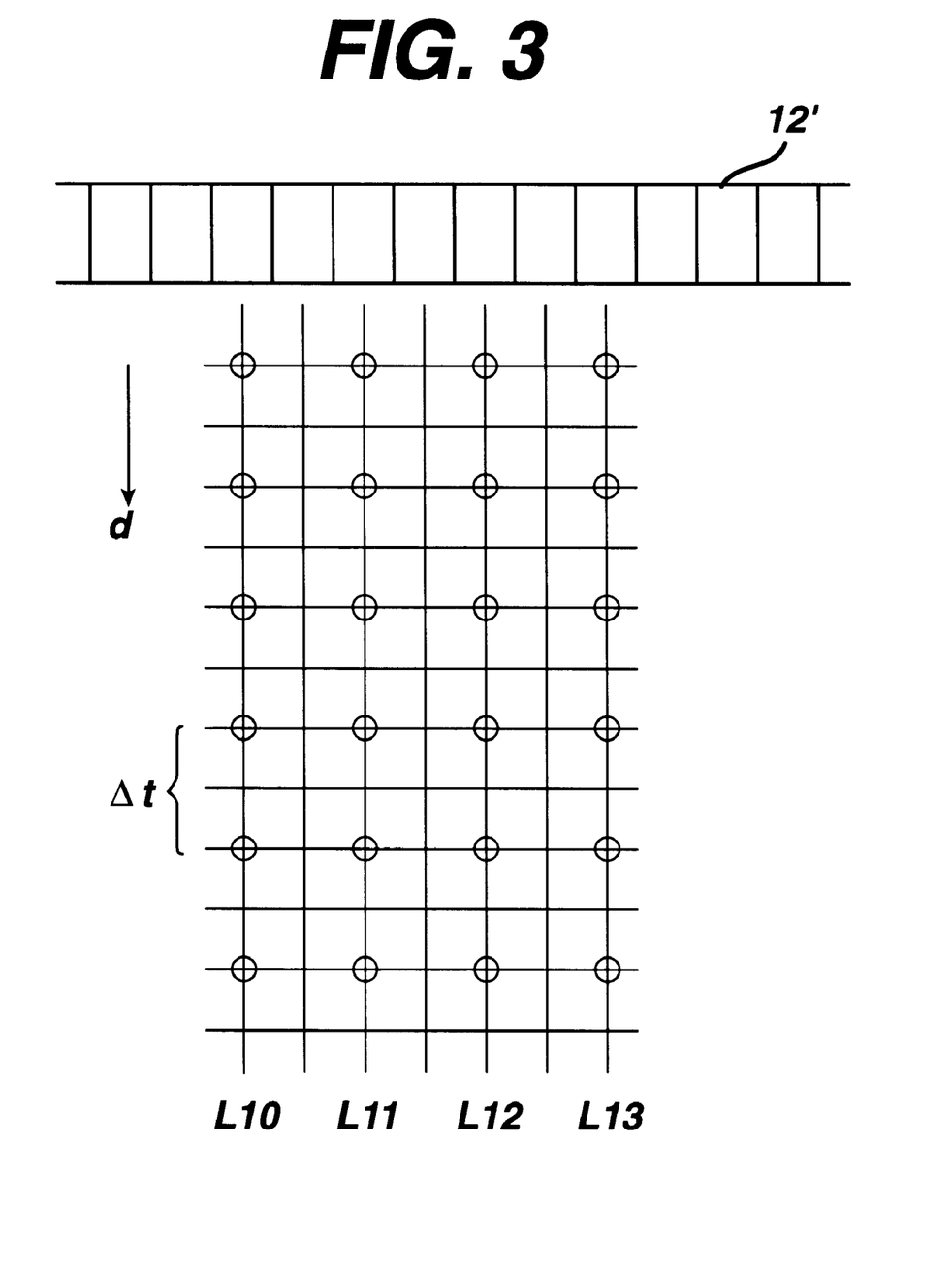
FIGS. 3 and 4 illustrate image data of two component images with different look directions.

FIG. 3 illustrates a section of an array transducer 12' and four scanlines L10, L11, L12 and L13 in an image field in front of the transducer. As echo signals return from along each scanline, they are sampled at discrete locations represented by the circles along each scanline. Each echo sample is at a different depth d from the transducer. The sample locations are seen to be evenly spaced along the scanlines in the example of FIG. 3. Since time and distance are corollaries in ultrasonic imaging, the evenly spaced circled locations in FIG. 3 may be sampled by acquiring echo samples at uniform time increments as the echoes are received from along each scanline. Beamformed estimates produced by a uniform sampling clock signal would be sufficient to sample the circled image points shown along each scanline in FIG. 3.

Figure 4A:
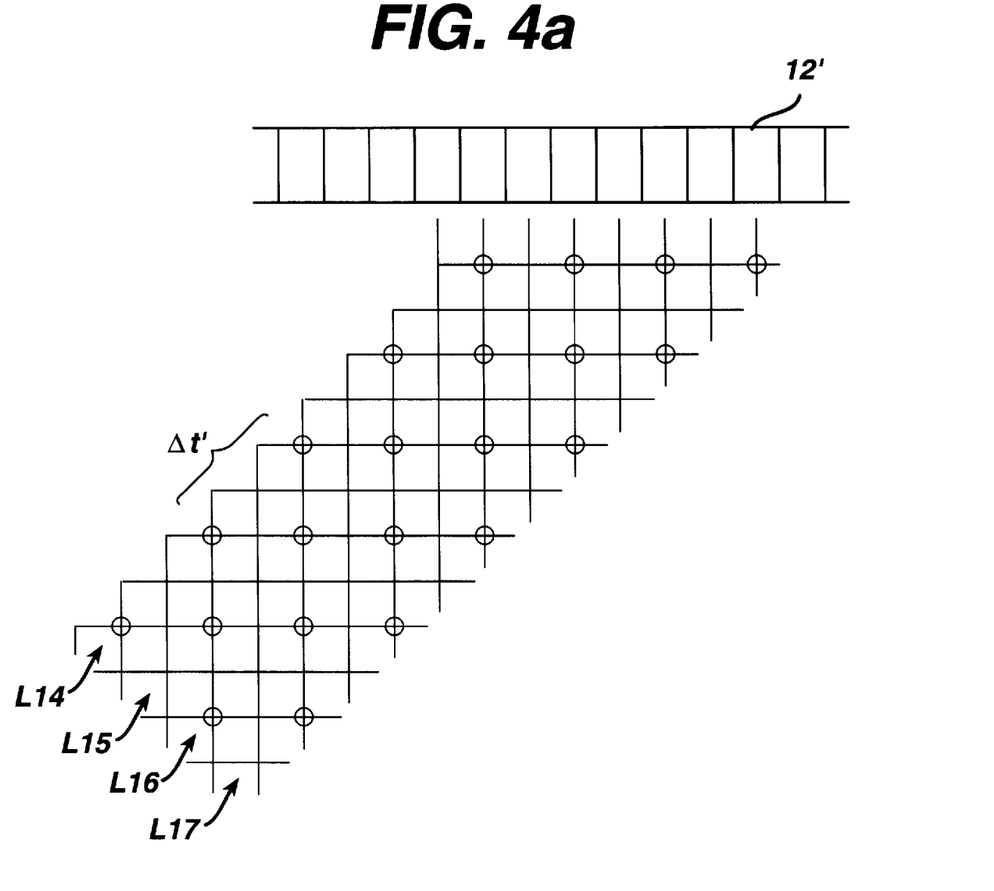

The direction of the scanlines in FIG. 3 is seen to be normal to the longitudinal axis of the array 12', a look direction which is straight ahead. When another component image is acquired with scanlines oriented in a different look direction, it is desirable for the echo samples to be located at the same locations as the echo samples of the "straight ahead" look direction of FIG. 3. FIG. 4a illustrates one technique in accordance with the principles of the present invention for achieving this sample alignment. In this drawing a second component image is acquired with scanlines steered 45° to the right of normal, relative to the array axis. Four scanlines of this different look direction are denoted as L14, L15, L16 and L17 in the drawing. In order for the samples to be taken at the same locations as those of the look direction of FIG. 3, the timing (and hence the locations) at which samples along each scanline are acquired is lengthened as a function of the scanline angle. It can be seen that the time interval (and hence the distance) Δt' between the samples of scanline L14 is greater than the time interval Δt (and corresponding distance) between the samples of scanline L10 in FIG. 3. It is seen that the samples of the component images are co-aligned by varying the spacing along scanlines at which samples are acquired as a function of the scanline angle.

While this technique of varying the sample acquisition of component images works well for compounding with two or three component images with angular relationships such as 45°, it leads to rapidly increasing complexity when the number of component images increases. When the number of component frames and hence look directions increases, the problem of co-aligning estimates from frame to frame becomes more complicated. The sample spacing becomes nonuniform and the scanline-to-scanline (lateral) spacing must also be varied if the same scanline angle is to be used across an image. Consistent timing becomes virtually unobtainable for large numbers of component images when the component images are phased array images, that is, the component image is formed of scanlines steered at a plurality of different angles.

Figure 4B:
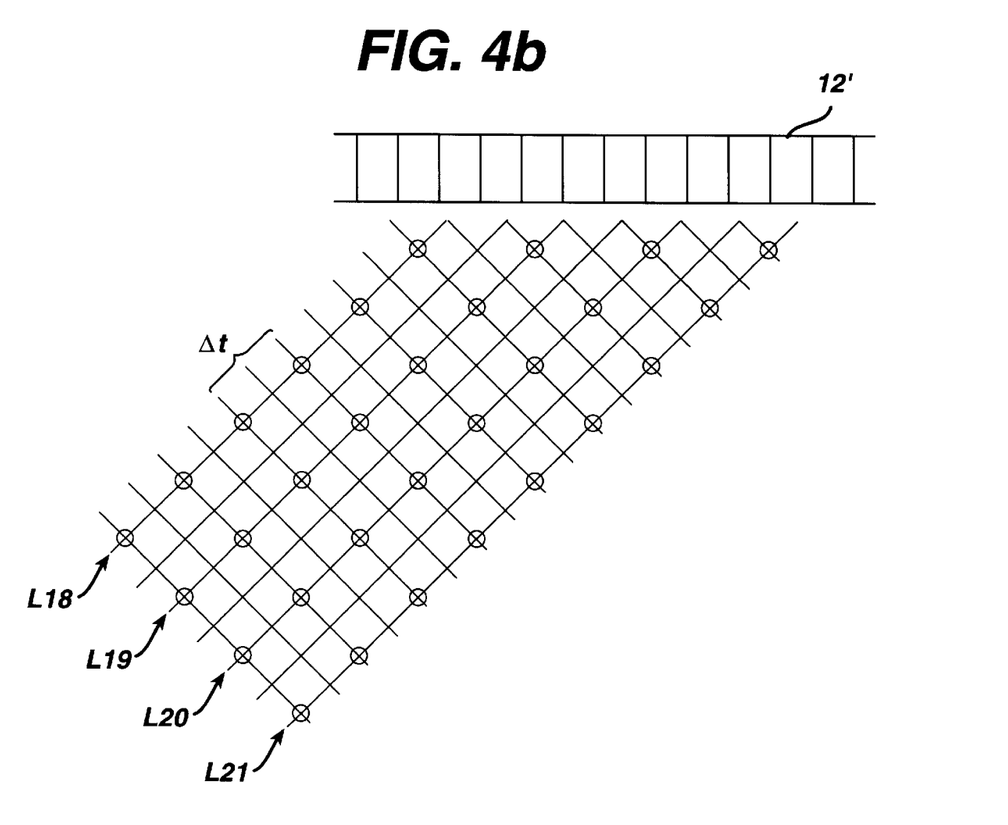

In accordance with a second embodiment of the present invention, a resampling process is used to co-align the sample locations of component images of different look directions. In a constructed embodiment resampling is carried out by the resampler 34 in FIG. 1, and performed by the digital signal processors 60 operating on acquired component frame data stored in frame memories 62 in FIG. 2. By the use of resampling the scanline data of each different look direction can be acquired by the same timing. For example FIG. 4b shows scanlines L18, L19, L20 and L21 with a look direction of +45°, the same as that of the scanlines of FIG. 4a. Unlike the previous embodiment, the echo samples along each scanline in FIG. 4a are evenly spaced with the same sample spacing (timing Δt) as that of the 0° (normal) scanlines of FIG. 3. Acquisition and processing is relatively simple, since each scanline and each look direction utilizes the same sample spacing along the scanline, and a consistent scanline spacing across the aperture of each component image.

Figure 5:
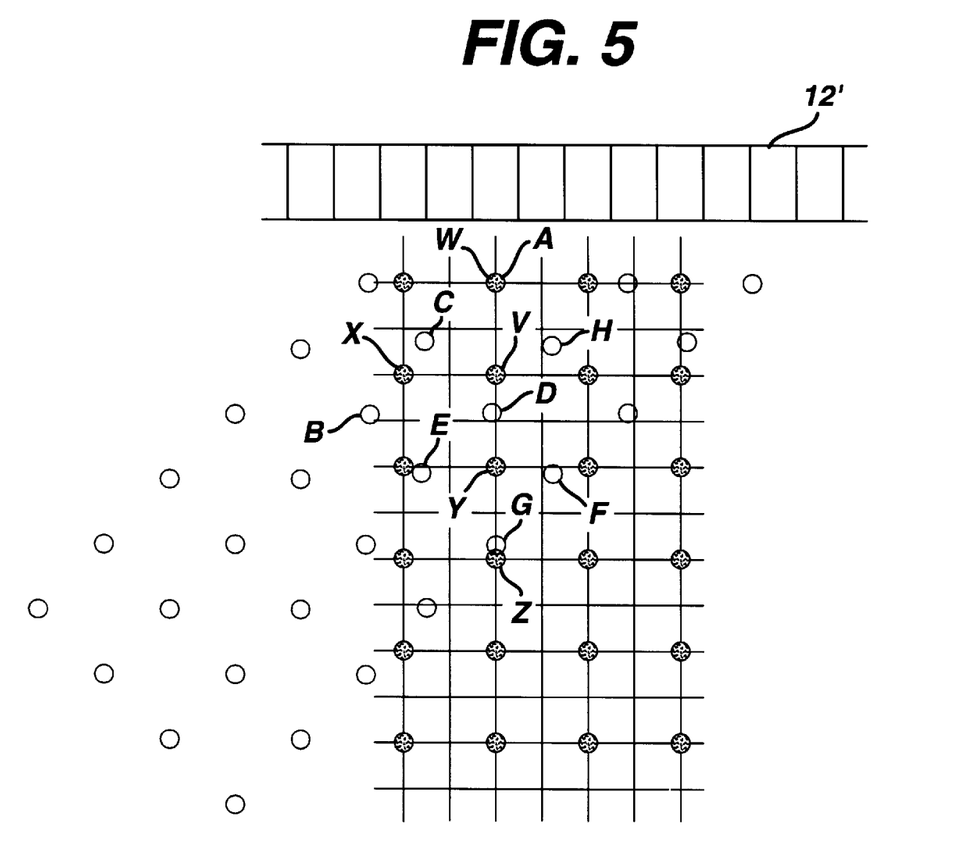
FIGS. 5 and 6 illustrate the resampling of one component image to the coordinate system of another.
Figure 6:
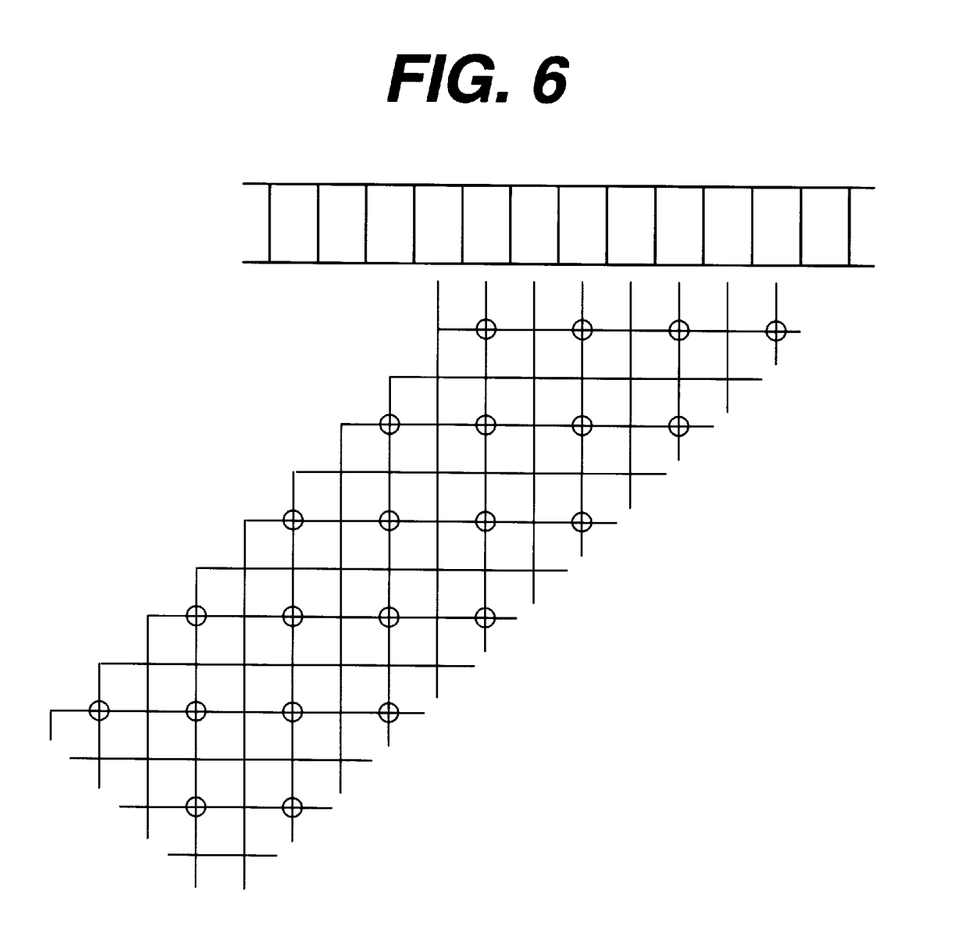

However when the sample points of the image of FIG. 3 is overlaid with the sample points of the image of FIG. 4a, it is seen that the sample points of the two component frames do not align, as FIG. 5 shows. (For clarity of illustration, the sample points of the FIG. 3 (0°) image are shaded in FIG. while the sample points of FIG. 4a (45°) are left clear.) In accordance with the principles of a second embodiment of the present invention, the samples of the two images are aligned by resampling the data of one of the images. Preferably the 0° image is used as the reference because, as will be seen, its orthogonal coordinates are convenient for conversion to display coordinates by the scan converter 40. Hence in the preferred embodiment the sample data of the 45° image is resampled to the coordinate system of the 0° image. Since the resampling process relocates sample values to a different coordinate system, the resampling process can be viewed as a first scan conversion of the acquired (estimate space) data. A number of resampling techniques may be employed. One is the nearest neighbor approximation technique, by which the coordinate locations of the 45° image samples are reassigned based on their proximity to the desired coordinates of the 0° image. For instance, sample G of the 45° image is seen to be in close proximity to the location of sample Z of the 0° image. The location of sample G can be simply changed to that of sample Z. A more precise technique is to interpolate a sample value at the 0° image coordinate locations from the 45° samples which are in the vicinity of the desired coordinate locations. For instance, samples B and C of the 45° image are seen to be proximate to the coordinate location of sample X of the 0° image. A new sample value can be computed for the sample X coordinate location using the values of samples B and C and their proximity to the sample X coordinate location. As another example, samples C, D and H are in the vicinity of the location of sample V and can be used to interpolate a sample value at that location. As yet a further example, samples D, E, F, and G are seen to be in the neighborhood of the sample Y coordinate location, and hence the values and locations of samples D, E, F and G can be interpolated to calculate a value for the sample Y coordinate location. Some estimates will already be co-aligned. For instance, in this example it is seen that sample W of the 0° image and sample A of the 45° image are co-aligned in the images as produced. Thus, by using the image data of the 45° image, the data is resampled to data values of a new coordinate system matching that of another component frame, as shown by FIG. 6. The FIG. 6 coordinate system is seen to be the same as that of FIG. 4a, but is acquired by resampling rather than acquisition timing modulation. Advantageously, the image data of any and all component frames can be resampled to a common coordinate system.

Figure 7:
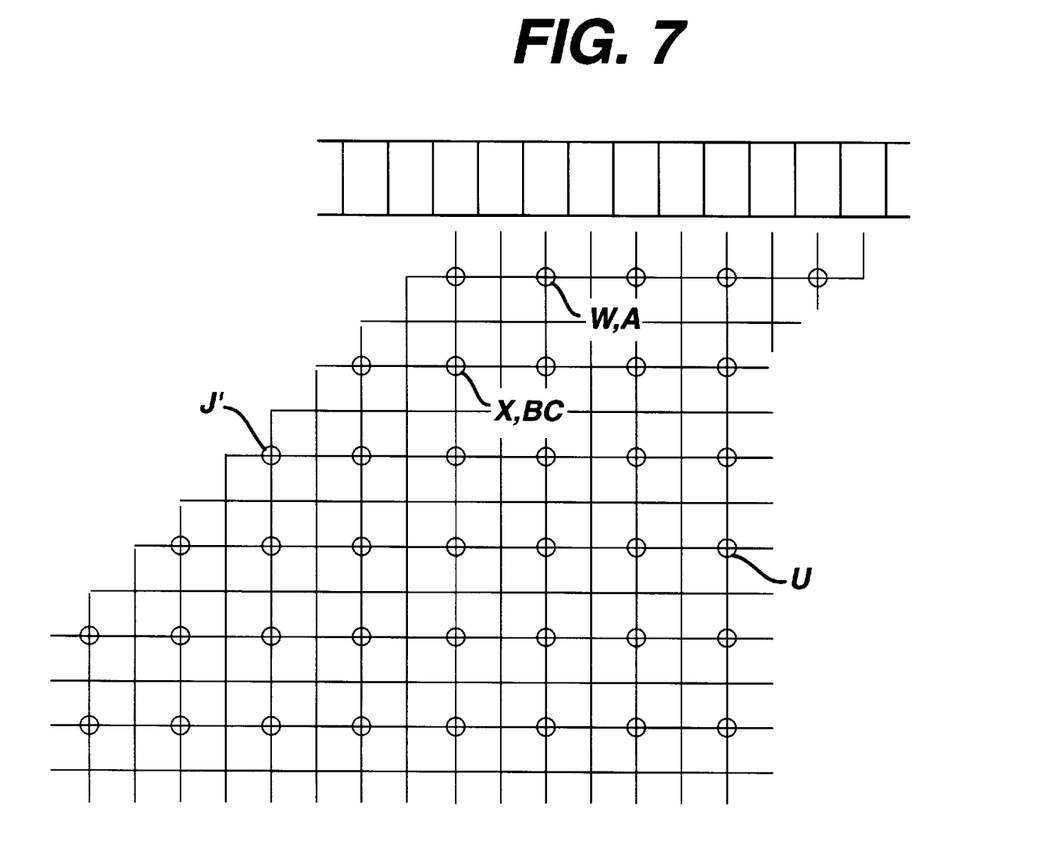
FIG. 7 illustrates spatially compounded image data in estimate space.

When the resampled data of FIG. 6 is overlaid on the FIG. 3 data, the result appears as shown in FIG. 7. As will be appreciated, some of the circle locations on this common coordinate system will be occupied by sample values from both component images, while others will be occupied by sample values from only one of the component images. In this example, sample W from the 0° image and sample A from the 45° image are co-aligned in the first row. Sample X from the 0° image and an interpolated value from samples B and C of the 45° image are co-aligned in the second row. A resampled value J' from the 45° image is shown in the third line, and a sample U from the 0° image is shown in the fourth line, neither aligned with a sample of the other image, and these two component frames do not overlay each other at these locations. In accordance with the present invention, the commonly aligned estimate space data is combined to form a compound image in estimate data space as shown in FIG. 7.

Figure 8:
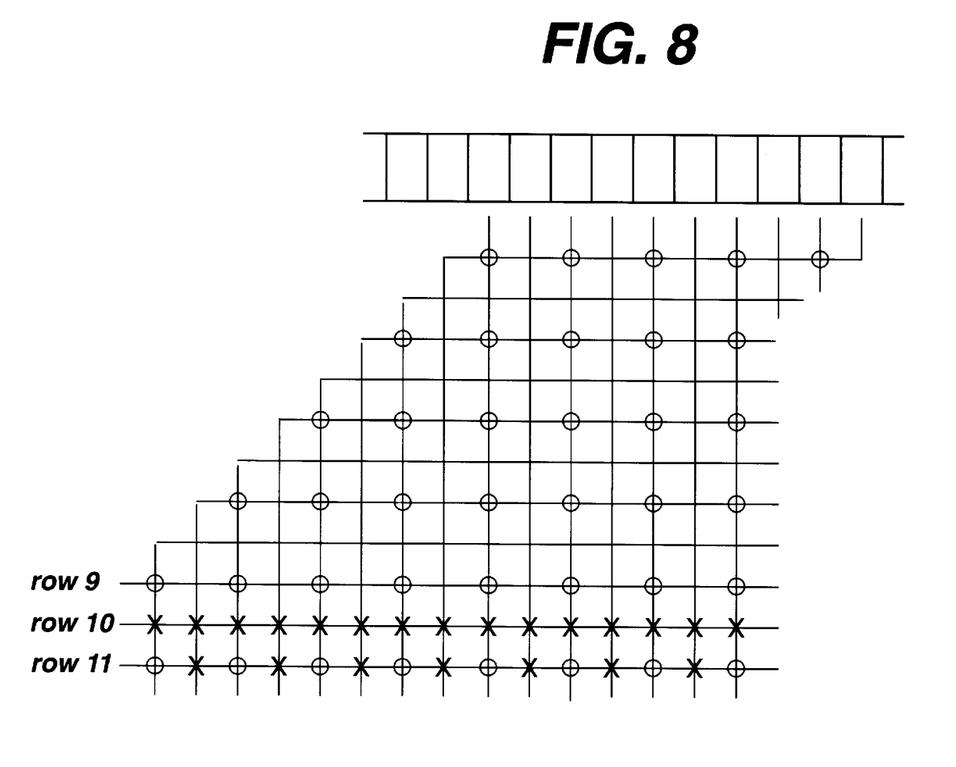
FIG. 8 illustrates conversion of the image data of a spatially compounded image to display space.

The spatially compounded image in estimate space is thereafter converted to display space coordinates by the scan converter 40. The scan converter will convert the matrix of estimate space data to a matrix of display space data suitable for the pixel characteristics of an image display. As is well known, such scan conversion uses interpolation, estimation and other hole-filling techniques to increase the number of data values for display. Scan conversion may also use decimation to reduce the number of data values, and will adjust its performance on the basis of whether an image is being magnified (zoom) or reduced in display size and density. In a typical application, an estimate space compound image may comprise 192 lines of 512 samples per line, and are converted to 640 by 480 display pixels. FIG. 8 exemplifies the operation of the scan converter 40, filling in new data values between each estimate space data value in row 11, and interpolating an entirely new row 10 of display data between rows 9 and 10. Preferably the spatially sampling density of echo acquisition is sufficient to support the display density so that the conversion to display space will not result in artifacts from spatially undersampled data.

Another advantage of the two stage scan conversion technique of the present invention is that it allows the formation of spatially compounded images and the display of those images to be decoupled from each other. Component images are acquired, resampled and compounded at rates commensurate with acquisition characteristics (e.g., number of component frames being compounded, depth of the compound image), while display scan conversion and display itself occur asynchronously as spatially compounded images are supplied to the scan converter 40. A further advantage of this is that the resampling and compounding operations are performed on the lesser amounts of data of estimate space, rather than the higher amounts of data of display space. This means that the formation of compound images is governed by the higher acquisition data rate rather than the slower speed of the formation of display data frames.

What is claimed is:

1. An ultrasonic diagnostic imaging system for producing spatially compounded images, including an array transducer which is operated to acquire component frames at a plurality of different look directions, comprising:

a compound image processor, responsive to acquired component frames of estimate space data, which produces a spatially compounded image of estimate space data; and a scan converter, responsive to said spatially compounded image, which converts said image to a spatially compounded image of display space data; and a video display, coupled to said scan converter, which displays said spatially compounded image of display space data.

2. The ultrasonic diagnostic imaging system of claim 1, wherein said compound image processor operates at a rate related to acquisition data rates; and wherein said scan converter operates at a rate related to display data rates.

3. The ultrasonic diagnostic imaging system of claim 1, wherein said compound image processor includes a resampler.

4. The ultrasonic diagnostic imaging system of claim 3, wherein said resampler relocates the image data of said component frames to a common coordinate system.

5. The ultrasonic diagnostic imaging system of claim 4, wherein said common coordinate system comprises the coordinate system of a 0° steered image.

6. The ultrasonic diagnostic imaging system of claim 4, wherein said resampler includes an interpolator which interpolates sample values at desired coordinate locations from acquired component frame data.

7. The ultrasonic diagnostic imaging system of claim 4, wherein said resampler comprises a scan converter which selectively scan converts component frames.

8. An ultrasonic diagnostic imaging system for producing spatially compounded images, including an array transducer which is operated to acquire component frames at a plurality of different look directions, comprising:

a compound image processor, responsive to acquired component frames of estimate space data, which produces spatially compounded images at an acquisition data rate; and a scan converter, responsive to said spatially compounded images, which converts said images to spatially compounded display images at a display data rate; and a video display, coupled to said scan converter, which displays said spatially compounded display images.

9. The ultrasonic diagnostic imaging system of claim 8, wherein said compound image processor includes a resampler.

10. The ultrasonic diagnostic imaging system of claim 9, wherein said resampler relocates the image data of said component frames to a common coordinate system.

11. The ultrasonic diagnostic imaging system of claim 10, wherein said common coordinate system comprises the coordinate system of a 0° steered image.

12. The ultrasonic diagnostic imaging system of claim 10, wherein said resampler includes an interpolator which interpolates sample values at desired coordinate locations from acquired component frame data.

13. The ultrasonic diagnostic imaging system of claim 10, wherein said resampler comprises a scan converter which selectively scan converts component frames.

14. A method for producing spatially compounded ultrasonic images for display comprising the steps of:

acquiring component frames of a spatially compounded image;

processing said component frames to produce a spatially compounded image of estimate space data;

scan converting said spatially compounded image of estimate space data to produce a spatially compounded image of display space data; and displaying said spatially compounded image of display space data.

15. The method of claim 14, wherein said step of acquiring comprises acquiring component frames having image data located at locations of a common coordinate system.

16. The method of claim 15, wherein said step of processing comprises combining component frames of a common coordinate to produce a spatially compounded image.

17. The method of claim 14, wherein said step of processing comprises resampling the image data of ones of said component frames to a common coordinate system.

18. The method of claim 17, wherein said step of resampling comprises resampling the image data of ones of said component frames to the coordinate system of a 0° steered image.

19. The method of claim 17, wherein said step of resampling comprises interpolating sample values at desired coordinate locations from data of said component frames.

20. The method of claim 14, wherein said step of processing comprises scan converting the component frames of a spatially compounded image to a common coordinate system.

21. The method of claim 14, wherein said step of processing spatially compounds estimate space data at an acquisition data rate.

22. The method of claim 21, wherein said step of scan converting produces spatially compounded image data at a display data rate.

23. The method of claim 22, wherein the amount of data of a display space data image is greater than the amount of data of an estimate space data image.

* * * * *